United States Patent [19]

Masuda et al.

[11] Patent Number: 5,324,492
[45] Date of Patent: Jun. 28, 1994

[54] METHOD OF REDUCING NITROGEN OXIDE CONTENT IN GAS

[75] Inventors: Senichi Masuda, Tokyo; Kaichi Sakakibara, Kyoto; Shigehiro Kitoh, Nishinomiya; Shigeo Saiki, Akashi, all of Japan

[73] Assignees: Takuma Co., Ltd., Osaka; Masuda Research, Inc.; Japan Marine Machinery Development Association, both of Tokyo, all of Japan

[21] Appl. No.: 918,277

[22] Filed: Jul. 22, 1992

[51] Int. Cl.$^5$ .................... C01B 21/00; C08F 2/46
[52] U.S. Cl. .................... 423/235; 204/157.46
[58] Field of Search .................... 423/235, 235 D; 204/157.46

[56] References Cited

U.S. PATENT DOCUMENTS 5,020,457  6/1991  Mathur et al. .................... 423/235

FOREIGN PATENT DOCUMENTS 0366876  5/1990  European Pat. Off.
4012458  1/1992  Fed. Rep. of Germany.
WO-A-9204962  4/1992  PCT Int'l Appl.

OTHER PUBLICATIONS

S. Masuda, "Destruction of Gaseous Pollutants and Air Toxics by Surface Discharge Induced Plasma Chemical Process and Pulse Corona Induced Plasma Chemical Process" presented Sep. 1992.
Masuda et al, "Destruction of Gaseous Pollutants by Surface Induced Plasma Chemical Process-SPCP" presented Sep. & Oct. 1991.
European Search Report dated Apr. 6, 1993 from European Patent Application No. 92112276.8.
Patent Abstracts of Japan vol. 014, No. 466 (C-0768) Nov. 1990 and JP-A-21 91 525.
Japanese laid-open Application No. 2-191525 published Jul. 27, 1990 (partial English translation).

*Primary Examiner*—Gregory A. Heller
*Attorney, Agent, or Firm*—Felfe & Lynch

[57] ABSTRACT

A method of reducing a nitrogen oxide content in gas is disclosed. In this method, subject gas containing nitrogen oxide is supplied to a gas passage of a surface discharger to decompose the nitrogen oxide content in the gas into nitrogen gas.

3 Claims, 3 Drawing Sheets

METHOD OF REDUCING NITROGEN OXIDE CONTENT IN GAS

BACKGROUND OF THE INVENTION

1. Field of the Invention

The present invention relates to a method of reducing nitrogen oxide content present in a gas such as a combustion exhaust gas from an engine, a boiler, an incinerator or the like, and more particularly to a method of decomposing the nitrogen oxide into nitrogen gas by means of an electric discharge into the gas containing the nitrogen oxide.

2. Description of the Related Art

As a method of reducing nitrogen oxide content by means of an electric discharge, it is known to use a corona discharger for decomposing the nitrogen oxide into nitrogen gas (e.g. the Japanese laid-open patent gazette No. Hei 2-191525). A further known method is illustrated in FIG. 8. In this method, subject gas is supplied to a gas passage 2 of a glow discharger 1' including a pair of electrodes 6, 7 opposing to each other across the gas passage 2 and a dielectric layer 4' formed on an opposing surface of at least either of the pair of electrodes 6, 7, so as to decompose the nitrogen oxide into nitrogen gas.

With either of the above-described conventional methods, decomposition of the nitrogen oxide content is to be effected by means of electric discharge into the atmosphere across the gas passage. For this reason, these conventional methods suffer problems to be described next.

In the case of a combustion exhaust gas from an engine, a typical nitrogen-oxide containing gas, the content of nitrogen oxide varies in accordance with variation in engine load. Similarly, in the case of a combustion exhaust gas from an incinerator, the content varies in accordance with the kind of objects incinerated in the incinerator. As a result, the condition between the electrodes, i.e. the insulation condition within the gas passage changes at every moment with continuous supply of the gas. Therefore, with the atmospheric discharge traversing the combustion exhaust gas flow, the discharge condition also varies in accordance with the variation in the insulation condition. Therefore, it is impossible to provide a constant amount of energy for effective decomposition of the nitrogen oxide. Consequently, decomposing performance deteriorates. Moreover, if an excessive amount of energy is supplied, the excess energy may even oxide NO (which makes up the largest portion of the nitrogen oxide present in the gas) into $NO_2$. Further, the atmospheric discharge is effected at a great number of electrodes distributed throughout the gas passage from its entrance to exit, the gas introduced through the entrance experiences the discharging operations for a plurality of times to receive an additional amount of energy with each discharging operation. Accordingly, in the case of the combustion exhaust air which has oxygen content, the above-described oxidation reaction (NO+O) of NO into $NO_2$ is very likely to occur.

As described above, the conventional methods can not provide good efficiency in the reduction of nitrogen oxide content by decomposing the oxide into nitrogen gas. Also, because of the problem of oxidation of NO into $NO_2$, a post treatment was necessary for treating this $NO_2$. As a result, the conventional methods suffer high initial and running costs.

SUMMARY OF THE INVENTION

A primary object of the present invention is to provide an improved method of reducing nitrogen oxide content in gas which method can eliminate the necessity of post treatment of $NO_2$ thereby to provide a cost advantage.

For accomplishing the above-noted object, a method of reducing a nitrogen oxide content in gas, relating to the present invention, comprises the step of: supplying subject gas to a gas passage of a surface discharger to decompose the nitrogen oxide content in the gas into nitrogen gas. Functions and effects of this method will be specifically described next.

According to the method of the present invention, the decomposing process, i.e. N-radical reaction: $N+NO \rightarrow 1/2 O_2$ is effected by applying energy to the subject gas through a surface discharging operation. Therefore, in comparison with the atmospheric discharging operation employed by the convention, the discharging operation takes place in a constant and stable manner without being affected by change in the inter-electrode insulation condition due to variation in the composition of the subject gas. Moreover, since the discharging operation of the method of the invention is a surface discharging operation, it is possible to provide the gas passage with an electrical continuity throughout from its entrance to exit without any discontinuities between adjacent electrodes. With this, in comparison again with the atmospheric discharging operation, the occurrence of oxidation reaction, i.e. $(NO+O \rightarrow NO_2)$, can be minimized.

According to a preferred embodiment of the present invention, in addition to the subject gas, a reducing gas for the nitrogen oxide is supplied to the gas passage of the surface discharger.

This feature has the advantage of further improving the decomposing efficiency. Specifically, in case ammonium gas is employed as the reducing gas, there occurs the reaction of: $(NO+NH_2 \rightarrow N_2+H_2O)$. In case hydro carbon gas is employed as the reducing gas, there occurs the reaction of: $(4CH+6NO \rightarrow 4CO+2H_2O)$. In case hydrogen gas is employed as the reducing gas, there occurs the reaction of: $(3H+2NO \rightarrow N_2+OH+H_2O)$.

As described above, according to the method of the present invention, it is possible to improve the efficiency in reducing nitrogen oxide in gas by decomposing the nitrogen oxide into nitrogen gas and also to minimize the oxidation reaction of $(NO+O \rightarrow NO_2)$ to eliminate any post treatment for $NO_2$ and consequently to achieve significant cost reduction in the decreasing operation of nitrogen oxide.

According to a further embodiment of the present invention, radicals of the reducing gas for the nitrogen oxide are produced and then these radicals are introduced into the subject gas containing the nitrogen oxide so as to decompose the nitrogen oxide into nitrogen gas. For producing the radicals, the reducing gas is supplied to the gas passage of the surface discharger. In this case, it is possible to use air or nitrogen gas, in addition to the ammonia gas, the hydrogen carbon, the hydrogen gas. And, the N-radicals produced through the discharge cause the reaction of: $(N+NO \rightarrow N_2+1/2 O_2)$.

With the above method, the radicals are produced by providing energy to the reducing gas through the discharging operation. Accordingly, this method has the advantage that the application of the energy to the reducing gas can be completed instantaneously whereby the gas passage can be of a very short length to restrict surface reaction. Further, since the application of the energy is effected not by the atmospheric discharging operation but by the surface glow discharging operation which can take place in a very stable manner on the discharging portion formed on the dielectric layer without being influenced by the gas, the production of the radicals can be effected very stably.

As described above, according to the above of the present invention, radicals of the reducing gas can be produced in an efficient manner and by causing the radicals to react with nitrogen oxide the reduction of the nitrogen oxide into nitrogen gas can be effected at lower costs and at a higher efficiency.

In addition to the above, it is also conceivable to employ air or nitrogen gas as the reducing gas and to produce radicals by supplying this air or nitrogen gas to the gas passage of a silent discharger. In this case, the discharger can be of any other type than the surface discharger. This method has the other advantage that air or nitrogen gas can be employed as the reducing gas whereby the nitrogen oxide reducing operation can be effected at further lower costs.

Further and other objects, features and effects of the invention will become more apparent from the following more detailed description of the embodiments of the invention with reference to the accompanying drawings.

DESCRIPTION OF THE PREFERRED EMBODIMENTS

Preferred embodiments of a method of reducing nitrogen oxide content in gas will be particularly described with reference to the accompanying drawings.

Figure 1:
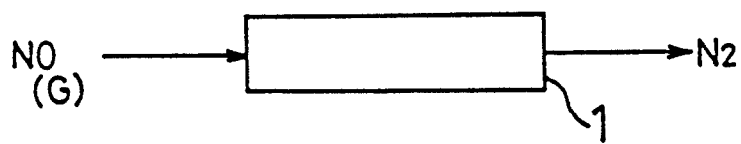
FIG. 1 is a block diagram.

As illustrated in FIG. 1, according to a method of the invention, subject gas G containing nitrogen oxide is supplied to a gas passage 2 (see FIGS. 2 and 3) of a surface discharger 1 to cause a reaction of: $(2NO+e \rightarrow N_2+O_2)$. That is, the method decomposes (reduces) the nitrogen oxide into nitrogen gas.

Figure 2:
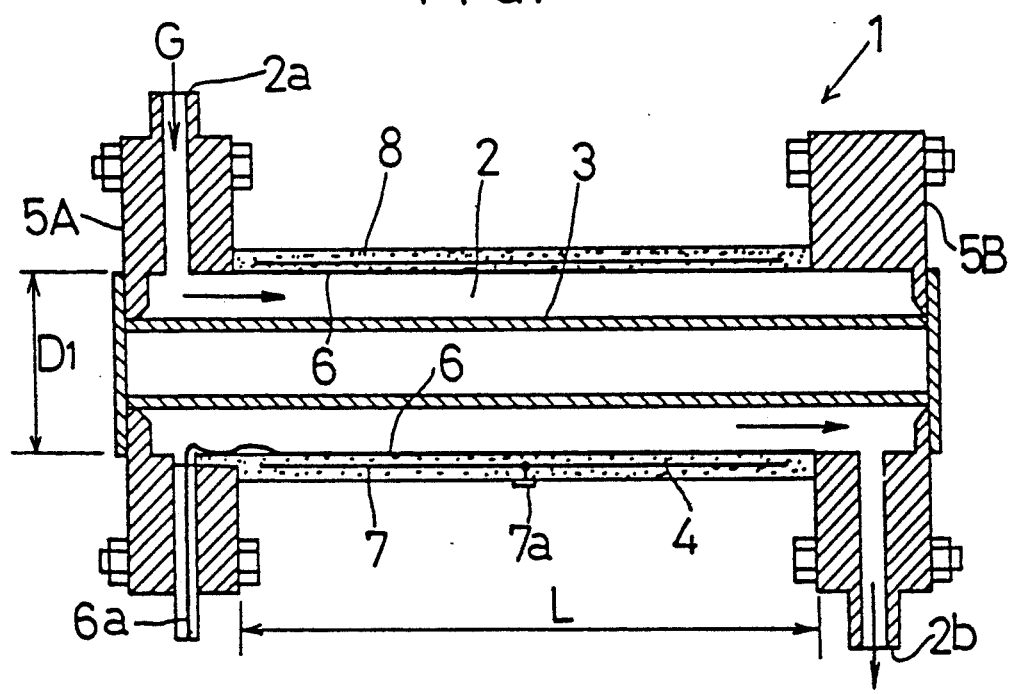
FIG. 2 is a vertical section showing major portions of a surface discharger.
Figure 3:
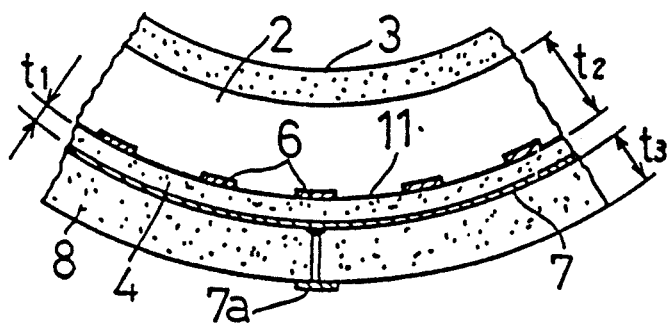
FIG. 3 is a section showing the major portions of the surface discharger.

The surface discharger 1, as shown in FIGS. 2 and 3, includes a cylindrical inner dielectric member 3 formed of glass and a cylindrical outer dielectric member 4 formed of ceramic. The inner and outer dielectric members 3, 4 are disposed between a pair of holders 5A, 5B to form the gas passage 2 between the inner and outer dielectric members 3, 4. On an inner peripheral surface of the outer dielectric member 4, there are provided a plurality of line-like discharge electrodes 6 extending along a longitudinal axis of the discharger, with the electrodes 6 being spaced apart from each other in a peripheral direction of the cylindrical member 4. On an outer peripheral surface of this outer dielectric member 4, there is provided a cylindrical dielectric electrode 7 to cover this outer peripheral surface. Further, an outer peripheral surface of the dielectric electrode 7 is covered with a cylindrical dielectric member 8 formed of ceramics. One holder 5A forms a gas entrance 2a of the gas passage 2 and the other holder 5B forms a gas exit 2b. The diameter of the gas exit 2b can vary conveniently. It should be noted, however, that the radicals of the reducing gas can become inactive if the exit diameter is too small. Therefore, the diameter should be large enough not to cause this inconvenience. The position of forming the gas exit 2b is not limited to that shown in FIG. 2. For instance, the exit can alternately be formed to be opened towards a right side end of the discharger.

The introduction of the gas G is effected along a tangential direction of the gas passage 2 so as to cause the introduced gas G to flow with a spiral movement within the gas passage 2. A reference mark 6a denotes a high-voltage terminal for the discharge electrodes 6. A mark 7a denotes a ground terminal for the dielectric electrode 7 and this terminal extends through the thickness of the cylindrical dielectric member 8. A reference numeral 11 denotes a glaze film (protection film). Incidentally, the plurality of discharge electrodes 6 are connected with each other at longitudinal ends thereof through an unillustrated line extending in the peripheral direction. That is, these electrodes 6 are parallel connected.

In operation of the surface discharger 1, through application of an alternating voltage by the discharging electrodes 6 and the dielectric electrode 7, a glow discharging portion is formed along the inner peripheral surface of the cylindrical outer dielectric member 4 so as to cause the reaction of $(2NO+e \rightarrow N_2+O_2)$.

The cylindrical outer dielectric member 4 has an inner diameter D1 of 6 mm and a thickness t1 of 0.5 mm. The length of the cylindrical inner dielectric member 3, i.e. the length L of the gas passage 2 in which the surface discharging portion is formed by the discharging electrodes 6 and the dielectric electrode 7, is 300 mm. The gas passage 2 has a thickness (t) of 3 mm, and the cylindrical dielectric member 8 has a thickness t2 of 1.5 mm.

In order to confirm the effects of the method of the above-described embodiments, the present inventor conducted experiments. In these experiments, the employed surface discharger 1 has the dimensional characteristics described above.

Experiment 1

Combustion exhaust gas containing 560 ppm of NOx, 1.0% of $O_2$ and the rest of $N_2$ was supplied as the subject gas G to the discharger. A discharging voltage of 6.7 kV was applied to the discharge electrodes 6 and the dielectric electrode 7. And, the NOx concentration was measured at the gas passage exit. The measurement showed 140 ppm NOx concentration.

Experiment 2

Figure 4:
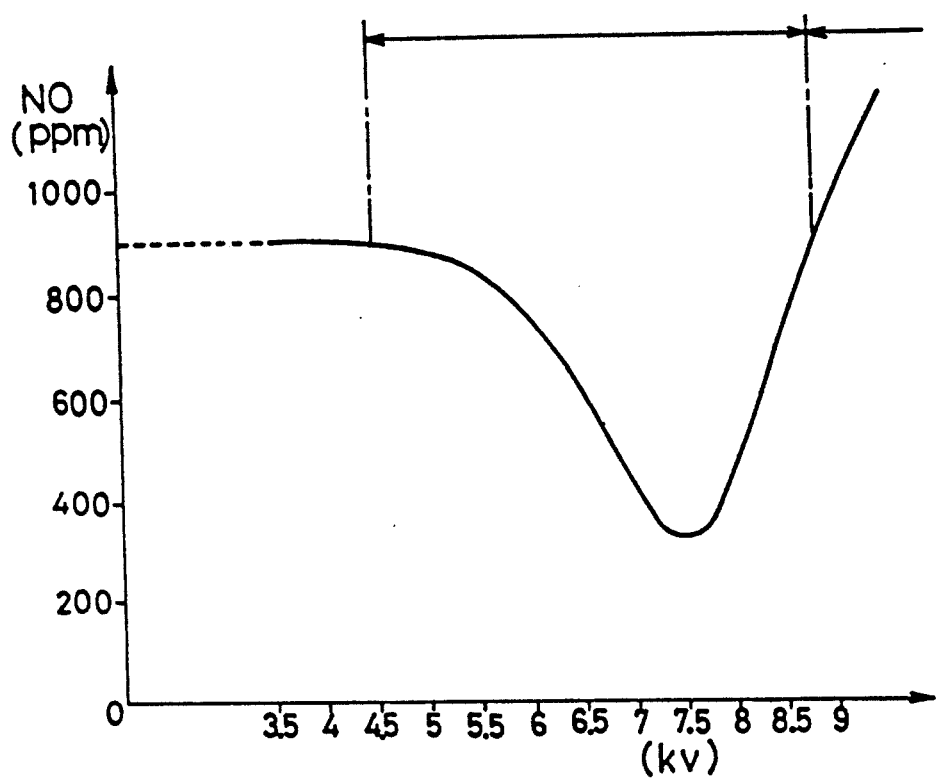
FIG. 4 is a graph illustrating a relationship between NO and a discharge voltage.

Gas containing NO and $O_2$ was supplied to the discharger. And, a relationship between the discharging voltage and the amount of reduction from NO to $N_2$ was observed. The result is illustrated in FIG. 4. The result shows that the reduction takes place in the range of discharging voltage between 4.5 and 9 kV.

A further embodiment of the present invention will be described next.

Figure 5:
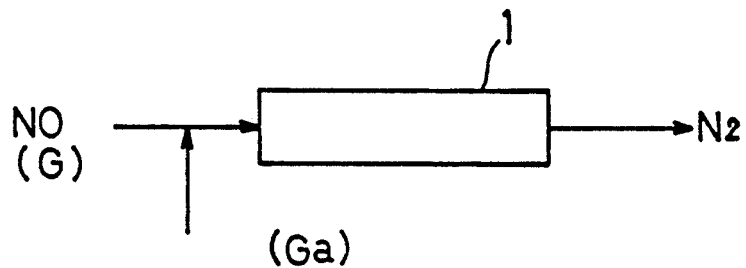
FIG. 5 is a block diagram illustrating a further embodiment.
Figure 8:
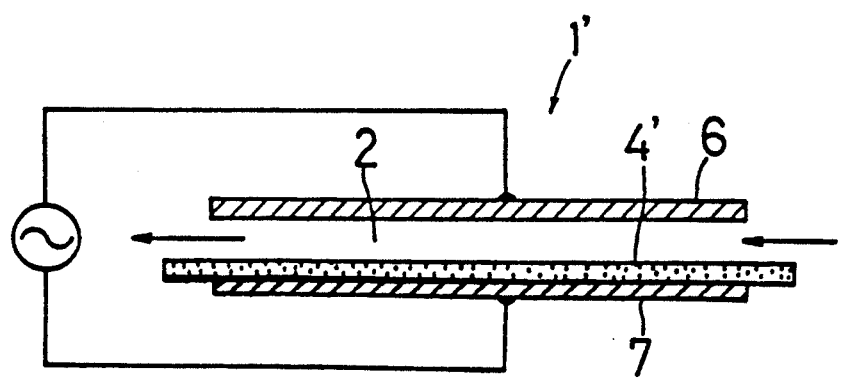
FIG. 8 is a principle diagram of a conventional discharger.

In this further embodiment, as illustrated in FIG. 5, together with the subject gas G, a reducing gas Ga for the nitrogen oxide is supplied to the surface discharger 1.

In this embodiment, in addition to the aforementioned reaction of: ($2NO+e \rightarrow N_2+O_2$), in case ammonium gas is employed as the reducing gas, there occurs the reaction of: ($NO+NH_2 \rightarrow N_2+H_2$). In case hydro carbon gas is employed as the reducing gas, there occurs the reaction of: ($4CH+6NO \rightarrow 3N_2+4CO+2H_2O$). In case hydrogen gas is employed as the reducing gas, there occurs the reaction of: ($3H+2NO \rightarrow N_2+OH+H_2O$).

For confirming the effects of the method of this further embodiment, the inventor conducted experiments to be described next.

Experiment 1

Combustion exhaust gas from a diesel engine containing 1040 ppm of NOx, 11.9% of $O_2$ and 6.9% of $CO_2$ was supplied as the subject gas G to the discharger. As the reducing gas, ammonium gas was supplied. A discharging voltage of 5 kV was applied to the discharge electrodes 6 and the dielectric electrode 7. And, the NOx concentration was measured at the gas passage exit. The measurement showed 480 ppm NOx concentration. In this embodiment, the same surface discharger 1 as the foregoing embodiment was used.

A still further embodiment will be described next.

Figure 6:
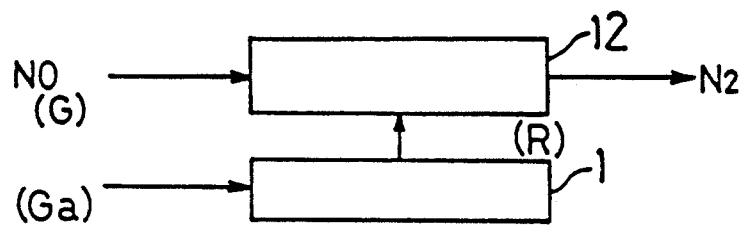
FIG. 6 is a block diagram.

In a method of this embodiment, as illustrated in FIG. 6, reducing gas GA for nitrogen oxide is supplied to the gas passage 2 of the surface discharger 1 to produce radicals R of the reducing gas Ga. And, these radicals R are guided to a mixing reactor 12 to be introduced into the subject gas G to decompose the nitrogen oxide into nitrogen gas.

Figure 7:
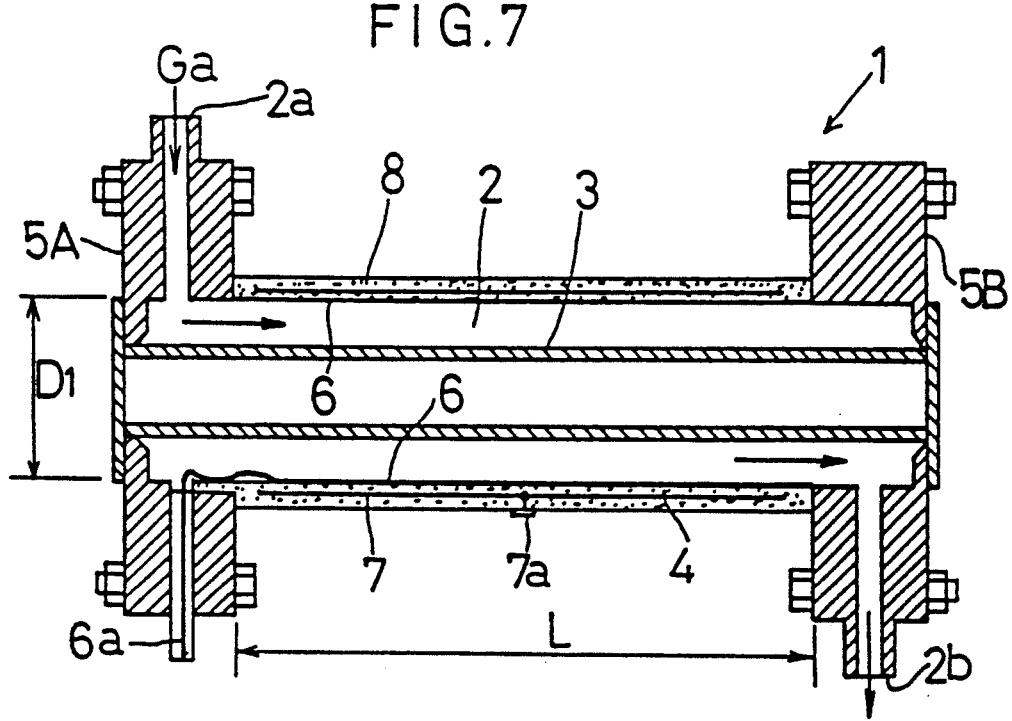
FIG. 7 is a vertical section of a further surface discharger.

The reducing gas Ga can comprise e.g. ammonia gas, hydrogen gas, nitrogen gas, air or the like. In case, ammonia gas is employed as the reducing gas Ga, there occurs the reaction of: ($NO+NH_2 \rightarrow N_2+H_2O$) at the mixing reactor 12. In case nitrogen gas is employed as the reducing gas Ga, there occurs the reaction of: ($2NO+2N \rightarrow 2N_2+O_2$) at the mixing reactor 12. The employed surface discharger 12 is the one shown in FIGS. 3 and 7.

For confirming the effects of the method of this embodiment, the inventor conducted further experiments to be described next. The surface discharger 1 employed in these experiments was the one having the above-described dimensional characteristics.

Experiment 1

Gas containing 400 ppm of NOx and 5% of $O_2$ was supplied as the subject gas G to the mixing reactor 12. Ammonia gas was supplied as the reducing gas Ga to the surface glow discharger 1. The, measurement was made of NOx concentration of the exhaust gas from the mixing reactor 12. The measurement showed a concentration of 180 ppm.

Experiment 2

Gas containing 400 ppm of Nox and not containing any $O_2$ was supplied as the subject gas G to the mixing reactor 12, and ammonia gas was supplied as the reducing gas Ga to the surface discharger 1. Then, the NOx concentration was measured on the exhaust gas from the mixing reactor 12. The measurement showed a concentration value of 10 ppm.

Incidentally, in the surface discharger 1 employed in all the foregoing embodiments, the charger includes the plurality of discharge electrodes 6 disposed in parallel with each other. Alternately, these discharge electrodes 6 can be disposed in a spiral format along the inner peripheral surface of the cylindrical outer dielectric member 4.

Experiment 3

Air: 0.8 $Nm^3/h$ was passed through silica gel to be rendered into dry air. And, this dry air was passed through the surface discharger to experience a discharging treatment (75 V, 0.4 A) and then was mixed with 10 $Nm^3/h$ of exhaust gas which contained 300 ppm of NO, 10% of $O_2$ and 5% of water vapor.

It was observed that the resultant exhaust gas after the mixing contained 100 ppm of $NO_2$, 15 ppm of NO ($NO_2+NO=115$ ppm). Thus, the process achieved the elimination ratio of 61.7%.

In the above, the air after the discharging operation contained 4000 ppm of $O_3$ which is substantially equal in moll to the NO content in the exhaust gas.

Experiment 4

With the same surface discharger employed in the above-described experiment 3, its discharging amount (140 V, 0.7 A) was increased to substantially double the amount of ozone to be produced to 8,000 ppm. And, the resultant ozone was mixed into the exhaust gas described in the experiment 3. The measurements on this exhaust gas were 50 ppm of $NO_2$, 10 ppm of NO ($NO_2+NO=60$ ppm), i.e. an elimination ratio of 80%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which become within the meaning and range of equivalency of the claims are therefore intended to be embraced therein.

What is claimed is:

1. A method of reducing a nitrogen oxide content in gas, comprising the steps of:
   supplying reducing gas comprising air to a gas passage formed between dielectric electrodes of a silent discharger capable of discharging without arc discharge;
   causing said reducing gas to discharge by applying a high voltage between a discharging electrode and a dielectric electrode of said silent discharger thereby to produce radicals; and
   introducing said radicals into a mixing reactor into which gas containing nitrogen oxide has been introduced, thereby to decompose said nitrogen oxide contained in said gas into nitrogen gas.

2. A method of reducing a nitrogen oxide content in gas, comprising the steps of:
   causing electrical discharge by applying a high voltage between a discharging electrode and a dielectric electrode of a surface discharger;
   supplying gas containing nitrogen oxide and reducing gas effective for the reduction of the nitrogen oxide to a gas passage formed between dielectric electrodes of said surface discharger; and decomposing said nitrogen oxide contained in said gas into nitrogen gas;

wherein said reducing gas comprises at least one selected from the group consisting of ammonia gas, hydrocarbon gas and hydrogen gas.

3. A method of reducing a nitrogen oxide content in gas, comprising the steps of:

supplying reducing gas effective for the reduction of the nitrogen oxide to a gas passage formed between dielectric electrodes of a surface discharger;

causing said reducing gas to discharge thereby to produce radicals by applying a high voltage between a discharging electrode and a dielectric electrode of said surface discharger; and introducing said radicals into a mixing reactor into which gas containing nitrogen oxide has been introduced, thereby to decompose said nitrogen oxide contained in said gas into nitrogen gas;

wherein said reducing gas comprises at least one selected from the group consisting of ammonia gas, hydrocarbon gas and hydrogen gas.

* * * * *